United States Patent
Nishikawa

(10) Patent No.: US 11,094,315 B2
(45) Date of Patent: Aug. 17, 2021

(54) IN-CAR COMMUNICATION CONTROL DEVICE, IN-CAR COMMUNICATION SYSTEM, AND IN-CAR COMMUNICATION CONTROL METHOD

(71) Applicant: Mitsubishi Electric Corporation, Tokyo (JP)

(72) Inventor: Gen Nishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 75 days.

(21) Appl. No.: 16/485,215

(22) PCT Filed: Mar. 17, 2017

(86) PCT No.: PCT/JP2017/010951
§ 371 (c)(1),
(2) Date: Aug. 12, 2019

(87) PCT Pub. No.: WO2018/167949
PCT Pub. Date: Sep. 20, 2018

(65) Prior Publication Data
US 2020/0043470 A1    Feb. 6, 2020

(51) Int. Cl.
| | | |
|---|---|---|
| *G10L 15/065* | (2013.01) | |
| *G10K 11/178* | (2006.01) | |
| *B60W 50/10* | (2012.01) | |
| *G10L 17/04* | (2013.01) | |

(52) U.S. Cl.
CPC ........... *G10L 15/065* (2013.01); *B60W 50/10* (2013.01); *G10K 11/17885* (2018.01); *G10L 17/04* (2013.01)

(58) Field of Classification Search
CPC ....... G10L 15/065; G10L 17/04; G10L 17/00; G10K 11/178; G10K 11/17885; B60W 50/10; B60R 16/02; H04R 3/00
See application file for complete search history.

(56) References Cited

U.S. PATENT DOCUMENTS

| 9,697,824 B1* | 7/2017 | Chen ................. G01C 21/3608 |
| 2009/0055178 A1* | 2/2009 | Coon ...................... G10L 17/00 704/246 |
| 2015/0006167 A1 | 1/2015 | Kato et al. |

(Continued)

FOREIGN PATENT DOCUMENTS

| JP | 2006-94389 A | 4/2006 |
| JP | 2007-43356 A | 2/2007 |

(Continued)

OTHER PUBLICATIONS

International Search Report, issued in PCT/JP2017/010951, PCT/ISA/210, dated Jun. 6, 2017.

(Continued)

*Primary Examiner* — Huyen X Vo
(74) *Attorney, Agent, or Firm* — Birch, Stewart, Kolasch & Birch, LLP

(57) ABSTRACT

A determination unit (7) determines whether or not a specific passenger in a car has spoken, on the basis of sound data collected in the car. A control unit (8) activates an in-car communication function, when it is determined by the determination unit (7) that the specific passenger has spoken.

8 Claims, 7 Drawing Sheets

(56) References Cited

U.S. PATENT DOCUMENTS

2016/0039356 A1* 2/2016 Talwar .................. H04R 3/005
                                                    381/86
2017/0217445 A1* 8/2017 Tzirkel-Hancock ........................
                                                    B60W 50/10

FOREIGN PATENT DOCUMENTS

| JP | 2007-208828 A | 8/2007 |
| JP | 2015-71320 A | 4/2015 |
| WO | WO 2014/002128 A1 | 1/2014 |

OTHER PUBLICATIONS

Chinese Office Action and Search Report for Chinese Application No. 201780088241.8, dated Sep. 22, 2020, with English translation of the Office Action.

Office Action issued in corresponding Japanese Application No. 2019-505649 dated Jan. 7, 2020.

Office Action dated May 13, 2021 in corresponding Chinese Application No. 201780088241.8.

* cited by examiner

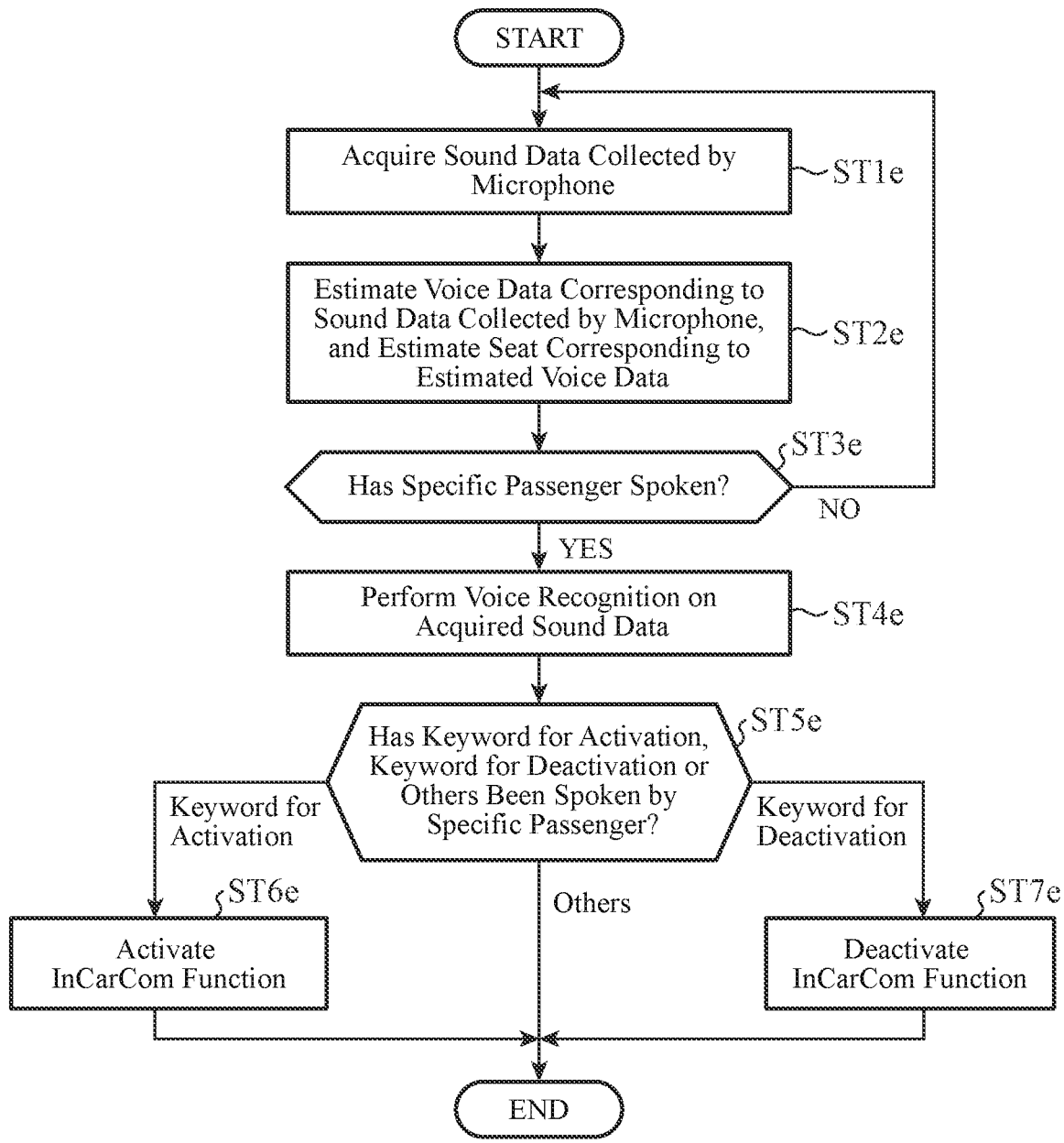

IN-CAR COMMUNICATION CONTROL DEVICE, IN-CAR COMMUNICATION SYSTEM, AND IN-CAR COMMUNICATION CONTROL METHOD

TECHNICAL FIELD

The present invention relates to an in-car communication control device, an in-car communication system and an in-car communication control method by which a function of an in-car communication to be established between passengers in a car is controlled.

BACKGROUND ART

Recently, a function of a communication established between the passengers by use of a microphone and a speaker provided in a car, i.e. in-car communication (hereinafter, simply referred to as "InCarCom"), begins to spread. For example, Patent Document 1 discloses a conventional in-car device having in-car communication function (hereinafter, simply referred to as "InCarCom function"). This in-car device, when it determines that a speech action by a front-seat passenger toward a rear-seat passenger has occurred, outputs voice data of the front-seat passenger toward the rear seat, and when it determines that the speech action is absent, controls a voice-data output unit so that voice data of the front-seat passenger is never outputted toward the rear seat.

CITATION LIST

PATENT LITERATURE

Patent Literature 1: Japanese Patent Application Laid-open Publication No. 2015-71320

SUMMARY OF INVENTION

Technical Problem

In the in-car device described in Patent Document 1, whether or not the speech action by the front-seat passenger toward the rear-seat passenger has occurred is determined on the basis of a detection result of a sight line or a face direction of the front-seat passenger. The sight line or the face direction of the front-seat passenger is detected by image analysis on image data in which the passenger is imaged. Thus, there is a problem of requiring an in-car camera for acquiring the image data and means for detecting the sight line or the face direction of the passenger by image analysis on the image data.

This invention solves the problem described above, and an object thereof is to provide an in-car communication control device, an in-car communication system and an in-car communication control method, which do not require detection of a speech action by the passenger, but can activate properly a function of an in-car communication to be established between the passengers.

Solution to Problem

An in-car communication control device according to the present invention comprises: a determination unit for determining whether or not a specific passenger in a car has spoken, on the basis of sound data collected in the car; and a control unit for activating a function of an in-car communication to be established between passengers in the car, when it is determined by the determination unit that the specific passenger has spoken.

Advantageous Effects of Invention

According to the present invention, whether or not the specific passenger has spoken is determined on the basis of the sound data collected in the car, so that detection of a speech action by the front-seat passenger toward the rear-seat passenger is not required. Furthermore, it is possible to activate properly the function of the in-car communication to be established between the passengers, when it is determined that the specific passenger has spoken to other passenger.

BRIEF DESCRIPTION OF DRAWINGS

FIG. 11 is a flowchart showing an in-car communication control method according to the fourth embodiment.

DESCRIPTION OF EMBODIMENTS

Hereinafter, for illustrating the present invention in more detail, embodiments for carrying out the present invention will be described according to the accompanying drawings.

FIRST EMBODIMENT

Figure 1:
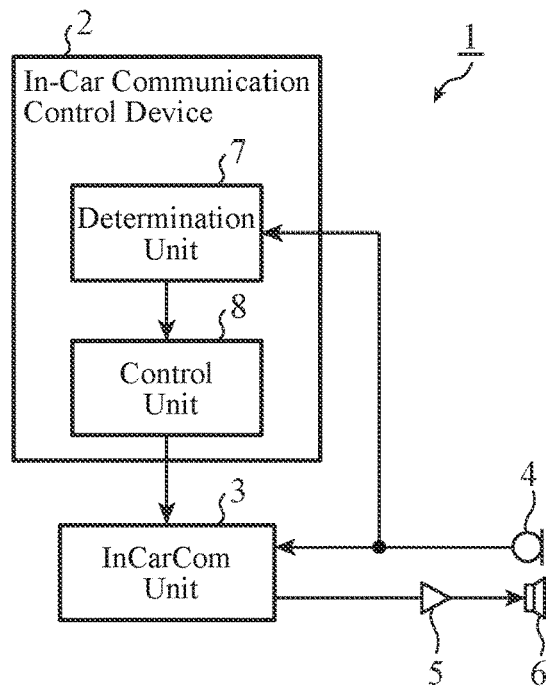
FIG. 1 is a block diagram showing a configuration of an in-car communication system according to the first embodiment of the present invention.

FIG. 1 is a block diagram showing a configuration of an in-car communication system 1 according to the first embodiment of the present invention. The in-car communication system 1 is a system in which an InCarCom function of a car is controlled, which is provided, for example, in an in-car system having the InCarCom function. Examples of the in-car system include a car navigation system and the like. In FIG. 1, the in-car communication system 1 includes an in-car communication control device 2, an in-car communication unit (hereinafter, simply referred to as "InCar-Com unit 3"), a microphone 4, an amplifier 5 and a speaker 6.

The in-car communication control device 2 activates the InCarCom unit 3 when a specific passenger has spoken. The term "specific passenger" means a single or multiple passengers selected from among passengers in the car, which is, for example, specified in the in-car communication control device 2 by using an input device (not shown) before the car start to travel.

Since talking from a rear-seat passenger to the driver may disturb the concentration on driving, it is suitable to specify the driver as the specific passenger.

The InCarCom unit 3 executes the InCarCom function that uses the microphone 4 and the speaker 6. For example, when the microphone 4 is placed around a front seat and the speaker 6 is placed around a rear seat, the InCarCom unit 3 applies voice-signal processing, such as echo cancelling, noise cancelling or the like, on voice data of the passenger collected by the microphone 4, and then causes, through the amplifier 5, the speaker 6 to output a voice. Further, when the InCarCom unit 3 is deactivated, although the microphone 4 continues said collecting, sound data collected by the microphone 4 is not outputted from the speaker 6.

The microphone 4 is a voice input device provided in the car, which may be a microphone included in already-existing in-car equipment. The amplifier 5 amplifies the intensity of a signal to be outputted to the speaker 6. The speaker 6 is a sound output device provided in the car, which may be a car-mounted speaker.

Further, as the microphone 4 and the speaker 6, those included in a mobile terminal capable of establishing wired/wireless communication connection with the in-car communication control device 2, may be used.

It is noted that, in FIG. 1, the microphone 4 for collecting a speech of the specific passenger and the speaker 6 for outputting a voice to a passenger as a conversation partner are each shown singularly; however, a microphone and a speaker may be provided for each of the passengers. Namely, a voice spoken by the specific passenger and collected by the microphone 4 is outputted from the speaker 6 provided at the seat of a passenger as a conversation partner, and a voice spoken by the passenger as the conversation partner is collected by another microphone provided at the seat of that passenger and is outputted from another speaker provided at the seat of the specific passenger.

As shown in FIG. 1, the in-car communication control device 2 includes a determination unit 7 and a control unit 8.

The determination unit 7 determines whether or not the specific passenger has spoken, on the basis of the sound data collected in the car. In the determination unit 7, the specific passenger selected from among the passengers in the car is specified.

For example, the determination unit 7 determines whether or not the specific passenger has spoken, on the basis of the sound data collected by the microphone 4.

The control unit 8 is a control unit for controlling the InCarCom unit 3, which activates the InCarCom unit 3, when it is determined by the determination unit 7 that the specific passenger has spoken.

Note that, since the InCarCom unit 3 is configured to execute the InCarCom function as described above, the phrases "activating the InCarCom unit 3" and "activating the InCarCom function" mean the same.

Figure 2A:
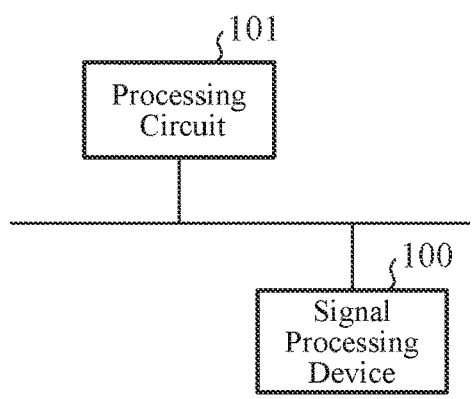
FIG. 2A is a block diagram showing a hardware configuration for implementing functions of an in-car communication control device according to the first embodiment.

FIG. 2A is a block diagram showing a hardware configuration for implementing functions of the in-car communication control device 2. In FIG. 2A, a signal processing device 100 and a processing circuit 101 are mutually connected through, for example, a bus line. The signal processing device 100 is a device for implementing the InCarCom unit 3.

Figure 2B:
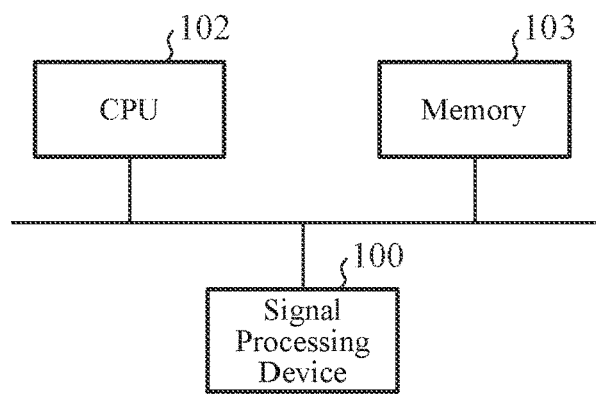
FIG. 2B is a block diagram showing a hardware configuration for executing software for implementing the functions of the in-car communication control device according to the first embodiment.

FIG. 2B is a block diagram showing a hardware configuration for executing software for implementing the functions of the in-car communication control device 2. In FIG. 2B, the signal processing device 100, a CPU (Central Processing Unit) 102 and a memory 103 are mutually connected through, for example, a bus line.

The respective functions of the determination unit 7 and the control unit 8 in the in-car communication control device 2 are implemented by a processing circuit. Namely, the in-car communication control device 2 includes the processing circuit for executing processing from Step ST1 to Step ST3 shown in FIG. 3. The processing circuit may be dedicated hardware and may be a CPU which executes programs stored in a memory.

For example, it is allowed that the determination unit 7 is implemented by a dedicated signal processing device and the control unit 8 is configured as a dedicated control device for controlling the InCarCom unit 3.

The determination unit 7, the control unit 8 and the InCarCom unit 3 may be integrated into one chip as a SoC (System On a Chip).

When the processing circuit is dedicated hardware shown in FIG. 2A, what corresponds to the processing circuit 101 is, for example, a single circuit, a composite circuit, a programmed processor, a parallel-programmed processor, an ASIC (Application Specific Integrated Circuit), an FPGA (Field-Programmable Gate Array) or any combination thereof. The respective functions of the determination unit 7 and the control unit 8 may be implemented by different processing circuits, and these functions may be implemented collectively by one processing circuit.

When the processing circuit is the CPU 102 shown in FIG. 2B, the respective functions of the determination unit 7 and the control unit 8 are implemented by software, firmware or a combination of software and firmware. The software or firmware is written as a program and is stored in the memory 103.

The CPU 102 reads out and executes the programs stored in the memory 103, to thereby implement the functions of the respective units. Namely, the in-car communication control device 2 is provided with the memory 103 for storing the programs by which, when they are executed by the CPU 102, as a result, the processing from Step ST1 to Step ST3 shown in FIG. 3 will be executed. These programs are provided for causing a computer to execute steps or processes of the determination unit 7 and the control unit 8.

What corresponds to the memory 103 is, for example, a non-volatile or volatile semiconductor memory, such as, a RAM (Random Access Memory), a ROM (Read Only Memory), a flash memory, an EPROM (Erasable Programmable Read Only Memory), an EEPROM (Electrically-EPROM) or the like, or a magnetic disc, a flexible disc, an optical disc, a compact disc, a mini disc, a DVD, or the like.

It is noted that the respective functions of the determination unit 7 and the control unit 8 may be implemented partly by dedicated hardware and partly by software or firmware.

For example, it is allowed that the function of the determination unit 7 is implemented by a processing circuit as dedicated hardware and the function of the control unit 8 is implemented in such a manner that the CPU 102 reads out and executes the program stored in the memory 103.

In this manner, the processing circuit(s) can implement the respective functions described above, by hardware, software, firmware or any combination thereof.

Next, operations will be described.

Figure 3:
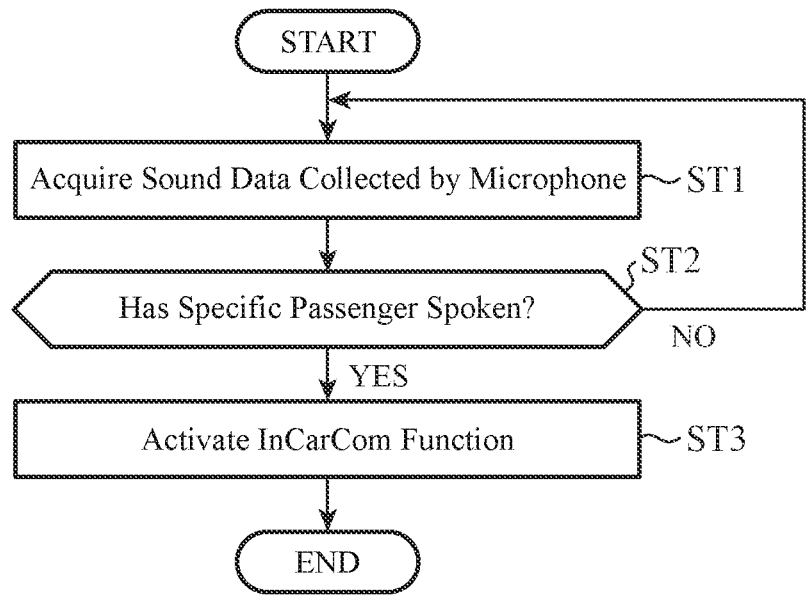
FIG. 3 is a flowchart showing an in-car communication control method according to the first embodiment.

FIG. 3 is a flowchart showing an in-car communication control method according to the first embodiment, which shows a series of processing steps until activation of the InCarCom function of the car.

The determination unit 7 acquires the sound data collected by the microphone 4 (Step ST1).

Then, on the basis of the acquired sound data, the determination unit 7 determines whether or not the specific passenger has spoken (Step ST2). The specific passenger is exemplified by a front-seat passenger or the like.

When it determines that the specific passenger has not spoken (Step ST2; NO), the in-car communication control device 2 returns to the processing of Step ST1.

The determination unit 7, when it determines that the specific passenger has spoken (Step ST2; YES), gives notification that the specific passenger has spoken, to the control unit 8.

Upon receiving the notification from the determination unit 7, the control unit 8 activates the InCarCom unit 3 (Step ST3). Namely, the InCarCom function is activated.

As described above, the in-car communication system 1 and the in-car communication control device 2 according to the first embodiment include the determination unit 7 and the control unit 8. The determination unit 7 determines whether or not a specific passenger in the car has spoken, on the basis of the sound data collected in the car. The control unit 8 activates the InCarCom unit 3, when it is determined by the determination unit 7 that the specific passenger has spoken.

With such a configuration, whether or not the specific passenger has spoken is determined on the basis of the sound data collected by the microphone 4, and thus, it is not required to detect a speech action by a front-seat passenger toward a rear-seat passenger. Furthermore, the InCarCom function can be activated properly when it is determined that the specific passenger has spoken to other passenger.

Second Embodiment

Figure 4:
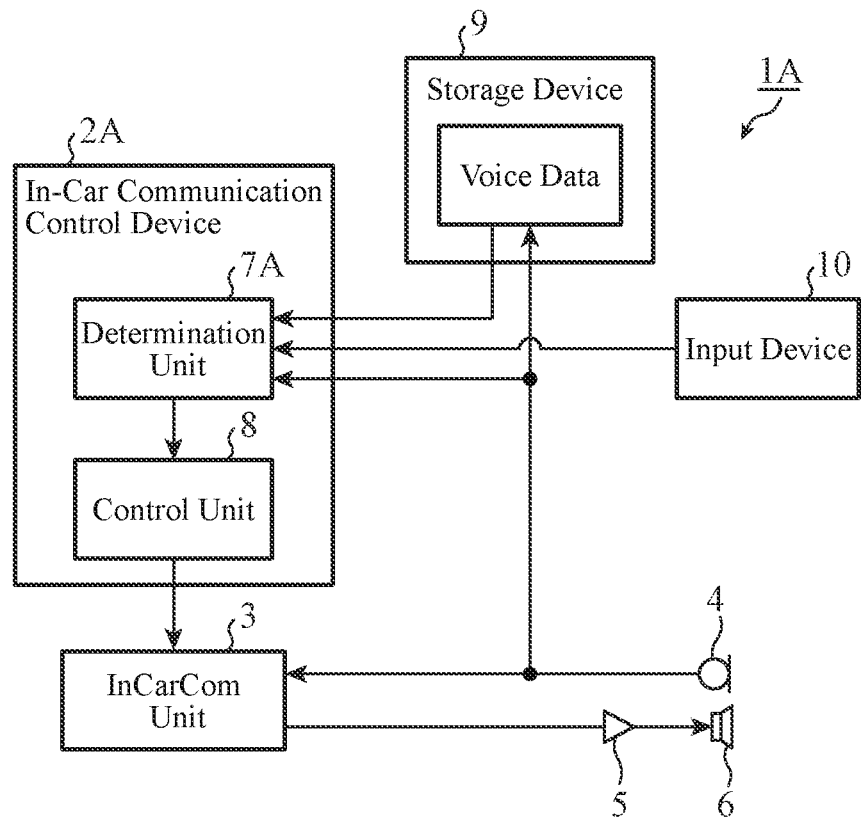
FIG. 4 is a block diagram showing a configuration of an in-car communication system according to the second embodiment of the present invention.

FIG. 4 is a block diagram showing a configuration of an in-car communication system 1A according to the second embodiment of the present invention, in which, for the configuration parts that are the same as those in FIG. 1, the same reference numerals are given, so that description thereof will be omitted.

Like the system described in the first embodiment, the in-car communication system 1A is a system in which an InCarCom function is controlled and is provided in a car navigation system or the like.

As shown in FIG. 4, the in-car communication system 1A includes an in-car communication control device 2A, an InCarCom unit 3, a microphone 4, an amplifier 5, a speaker 6, a storage device 9 and an input device 10.

As shown in FIG. 4, the in-car communication control device 2A includes a determination unit 7A and a control unit 8.

The determination unit 7A determines whether or not a specific passenger has spoken, on the basis of sound data collected by the microphone 4, information indicative of association relationships between seats and passengers in the car, and voice data of each of the passengers in the car. In the determination unit 7A, a specific passenger is specified in a manner corresponding to his/her seat. For example, when the driver is specified as the specific passenger, in the determination unit 7A, the "driver's seat" is specified as a reference for determination.

The storage device 9 is storing the voice data of each of the passengers in the car. The voice data of each of the passengers is data of previously-collected voice spoken by each of the passengers.

A memory included in already-existing in-car equipment may be employed as the storage device 9. For example, the voice data of each of the passengers is stored in the memory included in a car navigation system.

The input device 10 is a device for inputting information to the in-car communication control device 2A, and is, for example, an input device that employs a touch panel or a hardware button included in the car navigation system.

In the in-car communication control device 2A, the information indicative of association relationships between the seats and the passengers in the car is set by use of the input device 10. With reference to the thus-set information, the determination unit 7A can recognize which passenger is sitting on which seat in the car.

Like the first embodiment, the respective functions of the determination unit 7A and the control unit 8 in the in-car communication control device 2A are implemented by a processing circuit. Namely, the in-car communication control device 2A includes the processing circuit for executing these functions. As shown in FIG. 2A and FIG. 2B, the processing circuit may be dedicated hardware, and may be a CPU which executes programs stored in a memory.

Next, operations will be described.

Figure 5:
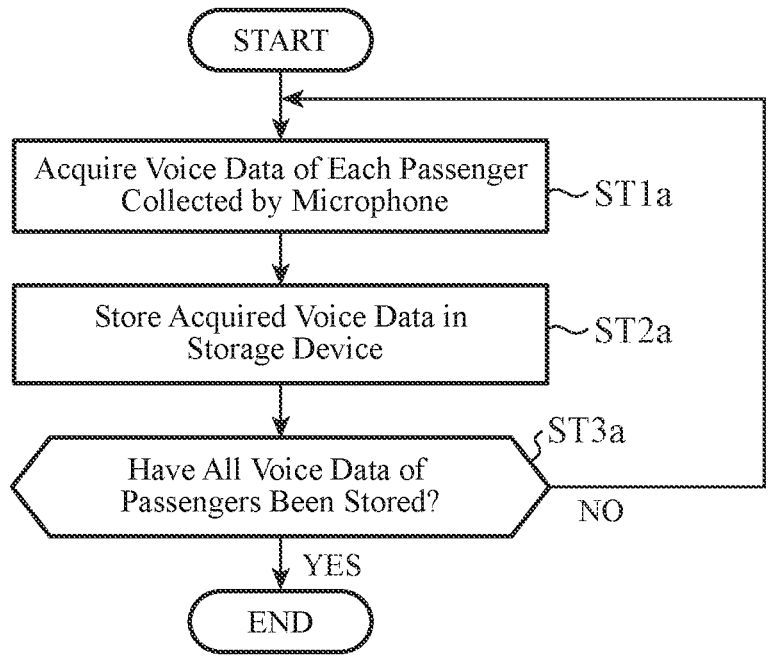
FIG. 5 is a flowchart showing voice-data registration processing.

FIG. 5 is a flowchart showing voice-data registration processing.

First, the in-car communication system 1A acquires the voice spoken by each of the passengers and collected by the microphone 4 (Step ST1a). The storage device 9 stores acquired voice data (Step ST2a). For example, the storage device 9 stores the voice data of each of the passengers while associating it with identification information of that passenger.

Then, the storage device 9 confirms whether or not all voice data of the passengers have been stored (Step ST3a). For example, the storage device 9, when it is notified of completion of the voice-data registration using the input device 10, determines that all voice data of the passengers have been stored.

When there remains the voice data of the passenger not stored in the storage device 9 (Step ST3a; NO), the flow returns to the processing of Step ST1a.

In contrast, when all voice data of the passengers have been stored in the storage device 9 (Step ST3a; YES), the in-car communication system 1A terminates the processing.

Figure 6:
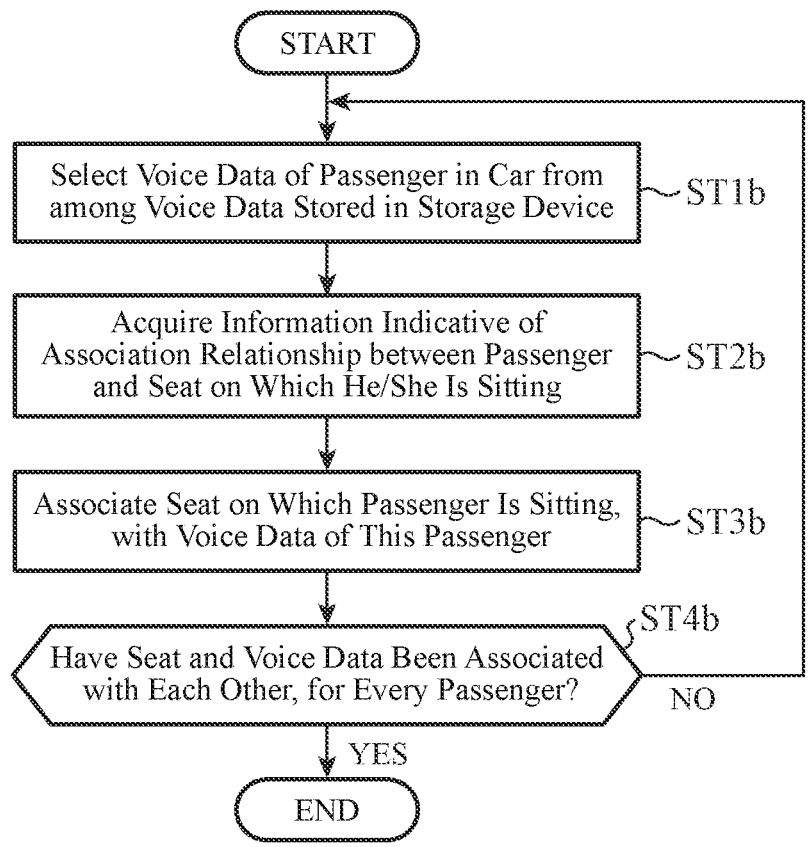
FIG. 6 is a flowchart showing processing for associating voice data of each of passengers with a seat in a car.

FIG. 6 is a flowchart showing processing for associating the voice data of each of passengers with a seat in the car. The determination unit 7A selects the voice data of the passenger in the car, from among voice data stored in the storage device 9 (Step ST1b).

Then, the determination unit 7A acquires information that is indicative of an association relationship between the seat and the passenger in the car and that has been inputted by use of the input device 10 (Step ST2b). For example, upon display of a seat-selection screen on a display (not shown), the passenger may select the seat for sitting by use of the input device 10 such as a touch panel or the like.

With reference to the information indicative of an association relationship between the seat and the passenger in the car, the determination unit 7A associates the voice data selected from the storage device 9 with the seat in the car (Step ST3b). For example, the determination unit 7A produces and retains referential data in which the voice data of the passenger and the seat on which that passenger is sitting are associated with each other.

Thereafter, the determination unit 7A confirms whether or not the seat and the voice data have been associated with each other for every passenger (Step ST4a).

When there remains the passenger for which the seat and the voice data are not associated with each other (Step ST4b; NO), the flow returns to Step ST1b, so that the unprocessed voice data of the passenger is selected.

In contrast, when the seat and the voice data have been associated with each other for every passenger (Step ST4b; YES), the determination unit 7A terminates the processing.

It is noted that, for the passenger whose voice data was already stored in the storage device 9, it is allowed to skip the voice-data registration processing shown in FIG. 5 and thus, to perform only the seat-association processing shown in FIG. 6.

Further, although a case has been described where the association processing shown in FIG. 6 is executed after execution of the voice-data registration processing shown in FIG. 5, this execution sequence may be reversed. For example, it is allowed that, after specifying the seat, the passenger sitting on that seat speaks, so that the voice data is registered.

Figure 7:
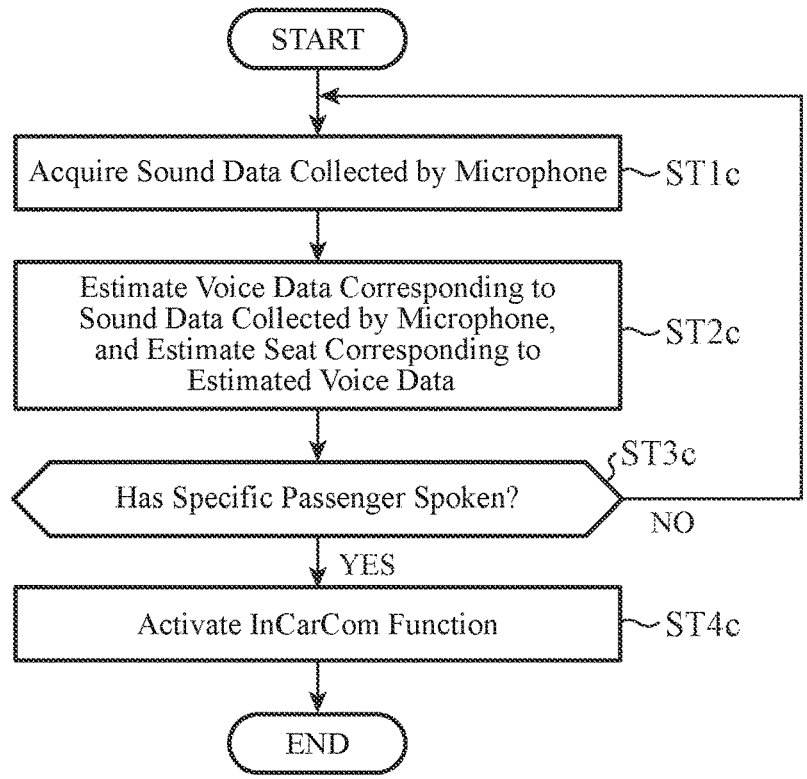
FIG. 7 is a flowchart showing an in-car communication control method according to the second embodiment.

FIG. 7 is a flowchart showing an in-car communication control method according to the second embodiment, which shows a series of processing until activation of the InCarCom function of the car. It is assumed that, in the determination unit 7A, the driver is specified as the specific passenger and the "driver's seat" is specified as a reference for determination. First, the determination unit 7A acquires the sound data collected by the microphone 4 (Step ST1c).

Then, the determination unit 7A estimates the voice data corresponding to the sound data collected by the microphone 4, from among the respective voice data selected from the storage device 9, to thereby estimate the seat corresponding to the estimated voice data (Step ST2c). For example, the determination unit 7A compares a frequency characteristic and a spectrum of the sound data collected by the microphone 4 with those of the voice data of each of the passengers, selected from the storage device 9, to thereby estimate which passenger's spoken voice has been collected by the microphone 4. Subsequently, the determination unit 7A refers to each of the referential data in which the voice data of the passenger and the seat on which that passenger is sitting are associated with each other, to thereby estimate the seat on which the passenger whose speech is estimated to have been collected is sitting.

Then, the determination unit 7A determines whether or not the specific passenger has spoken (Step ST3c).

For example, the determination unit 7A determines whether or not the seat estimated in Step ST2c is matched with the "driver's seat" as the reference for determination. When it determines that the specific passenger has not spoken, namely, the estimated seat is not the driver's seat (Step ST3c; NO), the in-car communication control device 2A returns to the processing of Step ST1c.

The determination unit 7A, when it determines that the specific passenger has spoken, namely, the estimated seat is the driver's seat (Step ST3c; YES), gives notification that the specific passenger has spoken, to the control unit 8.

Upon receiving the notification from the determination unit 7A, the control unit 8 activates the InCarCom unit 3 (Step ST4c). Namely, the InCarCom function is activated.

As described above, in the in-car communication system 1A and the in-car communication control device 2A according to the second embodiment, the determination unit 7A determines whether or not the specific passenger has spoken, on the basis of the sound data collected in the car, the information indicative of association relationships between the seats and the passengers in the car, and the voice data of each of the passengers in the car. Even with such a configuration, whether or not the specific passenger has spoken is determined on the basis of the sound data collected by the microphone 4, and thus, it is not required to detect a speech action by a front-seat passenger toward a rear-seat passenger. Furthermore, the InCarCom function can be activated properly when it is determined that the specific passenger has spoken to other passenger.

In particular, since the seat in the car is used as the reference for determination, it becomes easy to perform controlling on a per-seat basis, for example, not to activate the InCarCom function if the passenger sitting on a rear seat has spoken, but to activate the InCarCom function only when the passenger sitting on the front seat has spoken.

Third Embodiment

Figure 8:
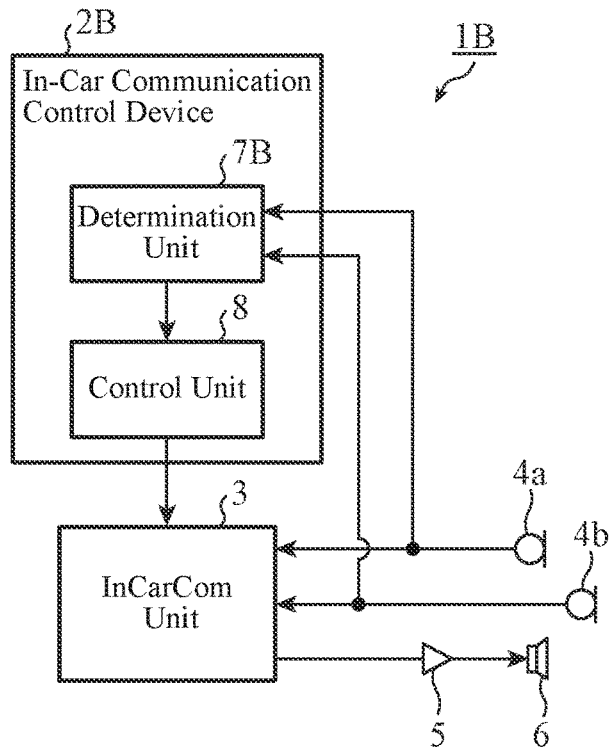
FIG. 8 is a block diagram showing a configuration of an in-car communication system according to the third embodiment of the present invention.

FIG. 8 is a block diagram showing a configuration of an in-car communication system 1B according to the third embodiment of the present invention, in which, for the configuration parts that are the same as those in FIG. 1, the same reference numerals are given, so that description thereof will be omitted.

Like the system described in the first embodiment, the in-car communication system 1B is a system in which an InCarCom function is controlled and is provided in a car navigation system or the like.

As shown in FIG. 8, the in-car communication system 1B includes an in-car communication control device 2B, an InCarCom unit 3, microphones 4a, 4b, an amplifier 5 and a speaker 6.

The microphones 4a, 4b are voice input devices placed at plural locations in the car, and are placed, for example, on the front-seat side and the rear-seat side in the car. Note that, in the third embodiment, the microphones have only to be placed at plural locations in the car, and thus the microphone may be placed at each of the seats.

As shown in FIG. 8, the in-car communication control device 2B includes a determination unit 7B and a control unit 8.

The determination unit 7B determines whether or not a specific passenger has spoken, on the basis of collection timings of respective sound data by the microphones 4a, 4b, or a position of the microphone that has collected a sound having a highest sound level.

In the determination unit 7B, the specific passenger is specified in a manner corresponding to his/her seat. For example, when the driver is specified as the specific passenger, in the determination unit 7B, the "driver's seat" is specified as a reference for determination.

The determination unit 7B estimates the seat of the passenger who has spoken, on the basis of the collection timings of the respective sound data by the microphones 4a, 4b, or the position of the microphone that has collected the sound having the highest sound level, and then compares the estimated seat with the seat specified as the reference for determination, to thereby determine whether or not the specific passenger has spoken.

When one of the passengers speaks in the car, the spoken voice arrives at and is collected by the microphone closest to that passenger in a shortest time, whereas it arrives at and is collected by the microphone farthest to that passenger in a longest time. Thus, the determination unit 7B estimates the seat of the passenger who has spoken, on the basis of a difference in collection timing of the voice (arrival time difference of the voice) depending on the positions of the microphones.

Further, when one of the passengers speaks in the car, the spoken voice is collected with the highest sound level by the microphone closest to that passenger, whereas it is attenuated and collected with a lower sound level by the microphone further from that passenger. Thus, the determination unit 7B may estimate the seat of the passenger who has spoken, on the basis of the difference in collected-sound level depending on the positions of the microphones.

Like the first embodiment, the respective functions of the determination unit 7B and the control unit 8 in the in-car communication control device 2B are implemented by a processing circuit. Namely, the in-car communication control device 2B includes the processing circuit for executing these functions. As shown in FIG. 2A and FIG. 2B, the processing circuit may be dedicated hardware, and may be a CPU which executes programs stored in a memory.

Next, operations will be described.

Figure 9:
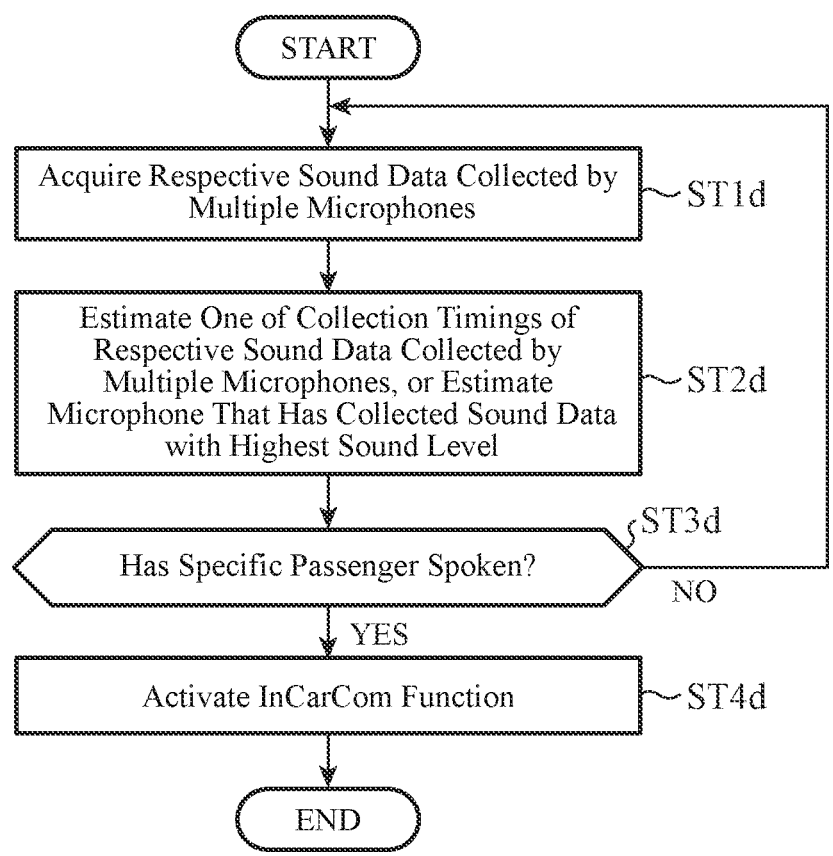
FIG. 9 is a flowchart showing an in-car communication control method according to the third embodiment.

FIG. 9 is a flowchart showing an in-car communication control method according to the third embodiment, which shows a series of processing until activation of the InCarCom function of the car. It is assumed that, in the determination unit 7B, the driver is specified as the specific passenger and the "driver's seat" is specified as a reference for determination. First, the determination unit 7B acquires the respective sound data collected by the microphones 4a, 4b (Step ST1d).

Subsequently, the determination unit 7B estimates the collection timings of the respective sound data by the microphone 4a, 4b, or estimates, from the microphones 4a, 4b, a microphone that has collected the sound data with the highest sound level (Step ST2d).

For example, when a same voice spoken by the passenger is collected by each of the multiple microphones, the determination unit 7B measures their respective collection timings. Then, the determination unit 7B estimates the microphone at which the voice arrives in the shortest time, to thereby estimate the seat that is closest to the thus-estimated microphone.

Instead, when a same voice spoken by the passenger is collected by each of the multiple microphones, the determination unit 7B measures the respective sound levels of their collected sounds. Then, the determination unit 7B estimates the microphone at which the sound level of the collected voice is highest, to thereby estimate the seat that is closest to the thus-estimated microphone.

Then, the determination unit 7B determines whether or not the specific passenger has spoken (Step ST3d).

For example, the determination unit 7B determines whether or not the seat estimated in Step ST2d is matched with the "driver's seat" as the reference for determination. When it determines that the specific passenger has not spoken, namely, the estimated seat is not the driver's seat (Step ST3d; NO), the in-car communication control device 2B returns to the processing of Step ST1d.

The determination unit 7B, when it determines that the specific passenger has spoken, namely, the estimated seat is the driver's seat (Step ST3d; YES), gives notification that the specific passenger has spoken, to the control unit 8.

Upon receiving the notification from determination unit 7B, the control unit 8 activates the InCarCom unit 3 (Step ST4d). Namely, the InCarCom function is activated.

It is noted that, although the description has been made about the case where the collection timings of the respective sound data by the microphone 4a, 4b, or from the microphone 4a and 4b, the microphone that has collected the sound data with the highest sound level, is estimated, these references may be combined.

For example, it is allowed that the determination unit 7B estimates the microphone at which the voice arrives in the shortest time and further estimates the microphone at which the sound level of the collected voice is highest, and then, when the thus-estimated microphones are the same, estimates it to be the microphone that is closest to the passenger who has spoken. This makes it possible to enhance reliability in the estimation of the microphone.

As described above, in the in-car communication system 1B and the in-car communication control device 2B according to the third embodiment, the determination unit 7B determines whether or not the specific passenger has spoken, on the basis of the collection timings of the respective sound data by the microphones 4a and 4b, or the position of the microphone that has collected the sound having the highest sound level. Even with such a configuration, whether or not the specific passenger has spoken is determined on the basis of the sound data collected by the microphones 4a and 4b, and thus, it is not required to detect a speech action by a front-seat passenger toward a rear-seat passenger. Furthermore, the InCarCom function can be activated properly when it is determined that the specific passenger has spoken to other passenger.

In particular, since sound collection timings or sound levels of the microphones 4a and 4b are used as references for determination, it is possible to omit registering the voice data of each of the passengers beforehand and associating the seat position with the passenger.

Fourth Embodiment

Figure 10:
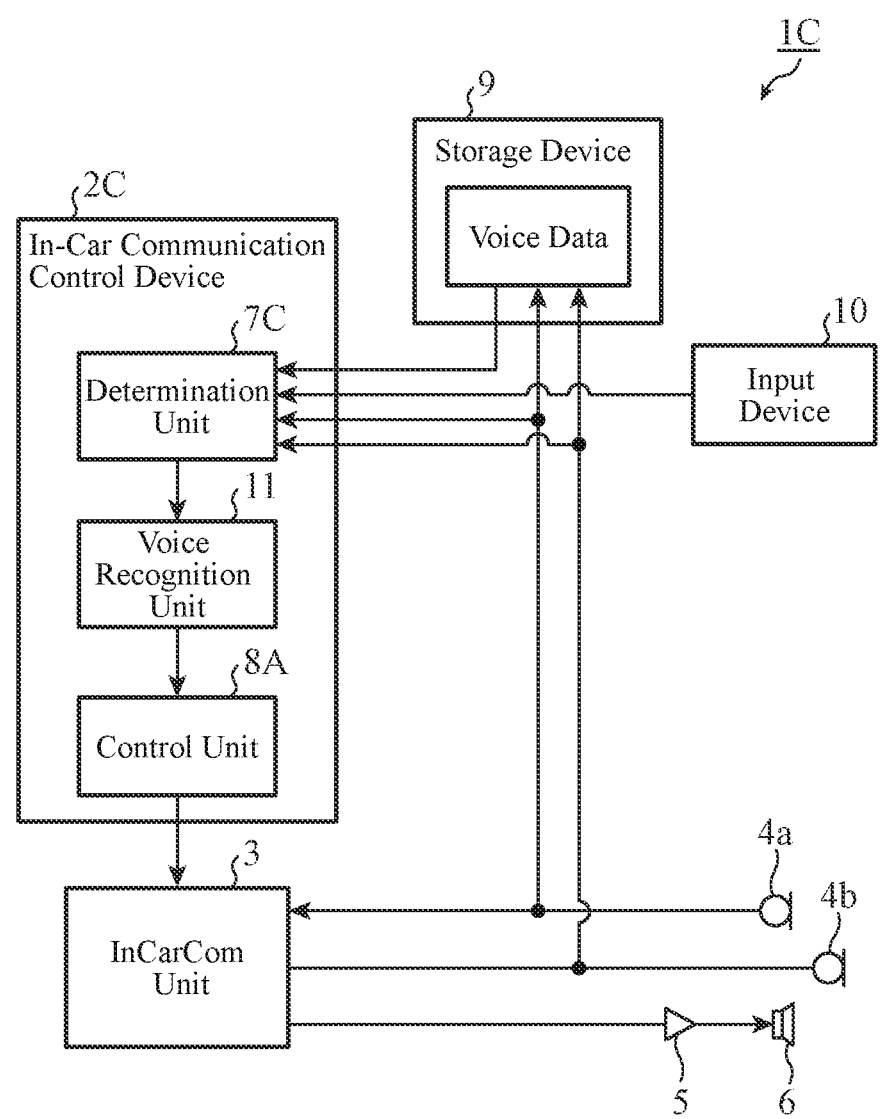
FIG. 10 is a block diagram showing a configuration of an in-car communication system according to the fourth embodiment of the present invention.

FIG. 10 a block diagram showing a configuration of an in-car communication system 1C according to the fourth embodiment of the present invention, in which, for the configuration parts that are the same as those in FIG. 1 and FIG. 4, the same reference numerals are given, so that description thereof will be omitted.

Like the system described in the first embodiment, the in-car communication system 1C is a system in which an InCarCom function is controlled, and is provided in a car navigation system or the like.

As shown in FIG. 10, the in-car communication system 1C includes an in-car communication control device 2C, an InCarCom unit 3, microphones 4a and 4b, an amplifier 5, a speaker 6, a storage device 9 and an input device 10.

As shown in FIG. 10, the in-car communication control device 2C includes a determination unit 7C, a control unit 8A and a voice recognition unit 11.

The determination unit 7C determines whether or not a specific passenger has spoken, on the basis of sound data collected by the microphones 4a and 4b, information indicative of association relationships between seats and passengers in the car, and voice data of each of the passengers in the car.

In the determination unit 7A, a specific passenger is specified in a manner corresponding to his/her seat. For example, when the driver is specified as the specific passenger, in the determination unit 7C, the "driver's seat" is specified as a reference for determination.

The control unit 8A, when it determines that a keyword for activation has been spoken by the specific passenger on the basis of a recognition result by the voice recognition unit 11, activates the InCarCom unit 3, and when it determines on that basis that a keyword for deactivation has been spoken by the specific passenger, deactivates the InCarCom unit 3.

The voice recognition unit 11 performs voice recognition on the sound data collected by the respective microphones 4a and 4b, to thereby confirm whether or not the keyword for activation or the keyword for deactivation is included in the voice spoken by the passenger.

Like the first embodiment, the respective functions of the determination unit 7C, the control unit 8A and the voice recognition unit 11 in the in-car communication control device 2C are implemented by a processing circuit. Namely, the in-car communication control device 2C includes the processing circuit for executing these functions. As shown in FIG. 2A and FIG. 2B, the processing circuit may be dedicated hardware, and may be a CPU which executes programs stored in a memory.

Next, operations will be described.

FIG. 11 is a flowchart showing an in-car communication control method according to the fourth embodiment, which shows a series of processing until activation or deactivation of the InCarCom function of the car.

It is assumed that, in the determination unit 7C, the specific passenger is specified, and his/her seat is specified as a reference for determination. First, the determination unit 7C acquires the sound data collected by the microphones 4a and 4b (Step ST1e).

Then, the determination unit 7C estimates the voice data corresponding to the sound data collected by the microphones 4a and 4b, from among the respective voice data selected from the storage device 9, to thereby estimate the seat corresponding to the estimated voice data (Step ST2e).

For example, the determination unit 7C compares a frequency characteristic and a spectrum of each of the sound data collected by the microphones 4a and 4b with those of the voice data of each of the passengers, selected from the storage device 9, to thereby estimate which passenger's spoken voice has been collected by the microphones 4a and 4b.

Subsequently, the determination unit 7C refers to each referential data in which the voice data of the passenger and the seat on which that passenger is sitting are associated with each other, to thereby estimate the seat on which the passenger whose speech is estimated to have been collected is sitting.

Then, the determination unit 7C determines whether or not the specific passenger has spoken (Step ST3e).

For example, the determination unit 7C determines whether or not the seat estimated in Step ST2e is matched with the seat as the reference for determination. When it determines that the specific passenger has not spoken (Step ST3e; NO), the in-car communication control device 2C returns to the processing of Step ST1e.

The determination unit 7C, when it determines that the specific passenger has spoken (Step ST3e; YES), outputs the voice data that it determines to be the voice spoken by the specific passenger, to the voice recognition unit 11.

The voice recognition unit 11 performs voice recognition on the voice data inputted from the determination unit 7C (Step ST4e). The recognition result by the voice recognition unit 11 is outputted to the control unit 8A.

On the basis of the recognition result by the voice recognition unit 11, the control unit 8A determines whether or not any one of the keyword for activation, the keyword for deactivation and another word has been spoken by the specific passenger (Step ST5e). When it is determined that the other word has been spoken by the specific passenger (Step ST5e; Other than Them), the control unit 8A terminates the processing.

In contrast, when it is determined that the keyword for activation has been spoken by the specific passenger (Step ST5e; Keyword for Activation), the control unit 8A activates the InCarCom unit 3 (Step ST6e).

Here, such a case will be cited as an example where, in a three-row seat car, the InCarCom unit 3 is provided for each of the seats, the passenger sitting on a front seat (first row seat) is specified as the specific passenger, and a plurality of different keywords are prepared each as the keyword for activation.

The control unit 8A, when it determines that the front-seat passenger has spoken "second row ON" as the keyword for activation, activates the InCarCom unit 3 between the front seat and a second row seat. This allows InCarCom between the front-seat passenger and the second row-seat passenger.

Further, the control unit 8A, when it determines that the front-seat passenger has spoken "third row ON" as the keyword for activation, activates the InCarCom unit 3 between the front seat and a third row seat. This allows InCarCom between the front-seat passenger and the third row-seat passenger.

Furthermore, the control unit 8A, when it determines that the front-seat passenger has spoken "all ON" as the keyword for activation, activates the InCarCom units 3 between the front seat, the second row seat and the third row seat. This allows InCarCom to be used between the front-seat passenger, the second row-seat passenger and the third row-seat passenger.

On the other hand, when it is determined that the keyword for deactivation has been spoken by the specific passenger (Step ST5e; Keyword for Deactivation), the control unit 8A deactivates the InCarCom unit 3 (Step ST7e).

Here, the case will be cited as an example where, in a three-row seat car, the InCarCom unit 3 is provided for each of the seats, the passenger sitting on a front seat (first row seat) is specified as the specific passenger, and a plurality of different keywords are prepared each as the keyword for deactivation.

The control unit 8A, when it determines that the front-seat passenger has spoken "second row OFF" as the keyword for deactivation, deactivates the InCarCom unit 3 between the front seat and a second row seat.

Further, the control unit 8A, when it determines that the front-seat passenger has spoken "third row OFF" as the keyword for deactivation, deactivates the InCarCom unit 3 between the front seat and a third row seat.

Furthermore, the control unit 8A, when it determines that the front-seat passenger has spoken "all OFF" as the keyword for deactivation, deactivates the InCarCom units 3 between the front seat, the second row seat and the third row seat.

As described above, in the in-car communication system 1C and the in-car communication control device 2C according to the fourth embodiment, the control unit 8A, when it determines that the keyword for activation has been spoken by the specific passenger on the basis of the recognition result by the voice recognition unit 11, activates the InCarCom unit 3, and when it determines on that basis that the keyword for deactivation has been spoken by the specific passenger, deactivates the InCarCom unit 3.

Even with such a configuration, whether or not the specific passenger has spoken is determined on the basis of the sound data collected by the microphones 4a and 4b, and thus, it is not required to detect a speech action by a front-seat passenger toward a rear-seat passenger. Furthermore, the InCarCom function can be activated properly when it is determined that the specific passenger has spoken to other passenger.

In particular, since keywords are used as references for determining activation and deactivation of the InCarCom function, it is possible to activate or deactivate the InCarCom function under various conditions matched with the keywords, so that the convenience of InCarCom can be enhanced.

It should be noted that unlimited combination of the respective embodiments, modification of any configuration element in the embodiments and omission of any configuration element in the embodiments may be made in the present invention without departing from the scope of the present invention.

INDUSTRIAL APPLICABILITY

The in-car communication control device according to the present invention does not require detection of a speech action of a passenger, but can activate properly the InCarCom function, and thus, it is applicable to an in-car device having the InCarCom function.

REFERENCE SIGNS LIST 1, 1A to 1C: in-car communication system, 2, 2A to 2C: in-car communication control device, 3: InCarCom unit, 4, 4a, 4b: microphone, 5: amplifier, 6: speaker, 7, 7A to 7C: determination unit, 8, 8A: control unit, 9: storage device, 10: input device, 11: voice recognition unit, 100: signal processing device, 101: processing circuit, 102: CPU, 103: memory.

The invention claimed is:

1. An in-car communication control device which determines when to activate an in-car communication function which enhances communication between passengers within a car, in-car communication function once activated acquiring speech from a specific passenger using a microphone within the car and outputting the acquired speech to another passenger using a speaker directed toward the another passenger, comprising:
processing circuitry
to determine whether or not a specific passenger in a car has spoken, on the basis of sound data collected from the microphone within in the car; and
to activate the in-car communication function of an in car communication to be established between the specific passenger and another one or more of the passengers in the car, when it is determined by the processor that the specific passenger has spoken.

2. The in-car communication control device according to claim 1, wherein the processing circuitry determines whether or not the specific passenger has spoken, on the basis of the sound data collected from the microphone within in the car, information indicative of association relationships between seats and passengers in the car, and voice data of each of the passengers in the car.

3. The in-car communication control device according to claim 1, wherein the processing circuitry determines whether or not the specific passenger has spoken, on the basis of collection timings of respective sound data by multiple microphones provided in the car.

4. The in-car communication control device according to claim 1, wherein the processing circuitry determines whether or not the specific passenger has spoken, on the basis of a position of the microphone among multiple telephones provided in the car, that has collected a sound having a highest sound level.

5. The in-car communication control device according to claim 1, wherein the processing circuitry performs voice recognition on the sound data collected in the car, and activates the function of the in-car communication, when it determines that a keyword for activation has been spoken by the specific passenger, on the basis of the voice recognition.

6. The in-car communication control device according to claim 1, wherein the processing circuit deactivates the function of the in-car communication, when it determines that a keyword for deactivation has been spoken by the specific passenger, on the basis of the voice recognition.

7. An in-car communication system which determines when to activate an in-car communication function which enhances communication between passengers within a car, in-car communication function once activated acquiring speech from a specific passenger using a sound input device within the car and outputting the acquired speech to another passenger using a sound output device provided in the car and directed toward the another passenger, comprising:
a sound input device provided in a car;
a sound output device provided in the car; and
a processor to execute a program,
processing circuitry
to determine whether or not a specific passenger in the car has spoken, on the basis of sound data collected by the sound input device; and
to activate the in-car function to be established between the specific passenger and another one or more of the passengers in the car by using the sound output device, when it is determined that the specific passenger has spoken.

8. An in-car communication control method for determining when to activate an in-car communication function which enhances communication between passengers within a car, in-car communication function once activated acquiring speech from a specific passenger using a sound input device within the car and outputting the acquired speech to another passenger using a sound output device provided in the car and directed toward the another passenger, comprising:
determining whether or not a specific passenger in a car has spoken, on the basis of sound data collected by a sound input device in the car; and
activating the in-car communication function to be established between the specific passenger and another one or more of the passengers in the car, when it is determined that the specific passenger has spoken.

* * * * *